(12) United States Patent
Palm (10) Patent No.: US 7,314,190 B2
(45) Date of Patent: Jan. 1, 2008

(54) METHOD AND DEVICE FOR DISINTEGRATION OF ORGANIC MATERIAL AND USE OF THE DEVICE

(75) Inventor: Carl-Olof Palm, Turku (FI)

(73) Assignee: Fractivator Oy, Tampere (FI)

( * ) Notice: Subject to any disclaimer, the term of this patent is extended or adjusted under 35 U.S.C. 154(b) by 208 days.

(21) Appl. No.: 10/534,085

(22) PCT Filed: Dec. 29, 2003

(86) PCT No.: PCT/FI03/00983

§ 371 (c)(1),
(2), (4) Date: May 6, 2005

(87) PCT Pub. No.: WO2004/062808

PCT Pub. Date: Jul. 29, 2004

(65) Prior Publication Data

US 2006/0011757 A1    Jan. 19, 2006

(30) Foreign Application Priority Data

Jan. 15, 2003    (FI) .................................. 20030058

(51) Int. Cl.
*B02C 1/00* (2006.01)
(52) U.S. Cl. .................. 241/21; 241/27; 241/188.1
(58) Field of Classification Search ................ 241/21, 241/27, 188.1, 188.2
See application file for complete search history.

(56) References Cited

U.S. PATENT DOCUMENTS

| | | | |
|---|---|---|---|
| 4,691,867 A * | 9/1987 | Iwako et al. ................. 241/21 |
| 4,813,619 A * | 3/1989 | Tjumanok et al. ............ 241/80 |
| 5,593,099 A | 1/1997 | Langenecker | |
| 5,846,425 A | 12/1998 | Whiteman | |
| 5,904,308 A * | 5/1999 | Schnell ..................... 241/188.2 |
| 6,202,946 B1 | 3/2001 | Virtanen ....................... 241/21 |

FOREIGN PATENT DOCUMENTS

| | | |
|---|---|---|
| EP | 1 300 195 | 4/2003 |
| EP | 1 346 956 | 9/2003 |
| GB | 891152 | 3/1962 |
| WO | WO 03/035558 | 5/2003 |

OTHER PUBLICATIONS

Derwent Database WPI, AN 2001-085387, JP 3270748 B2, Shoda, (Apr. 2002).

* cited by examiner

*Primary Examiner*—Faye Francis
(74) *Attorney, Agent, or Firm*—James C. Lydon (57) ABSTRACT

A method and apparatus for biological and/or chemical decomposition of waste containing organic matter. The method includes waste pretreatment in which waste is fragmented and homogenised in a pretreatment apparatus (10a, 10b) operating on the principle of a multi-ring double action impact mill. The apparatus has either two rotors (62, 64) or a rotor and stator disposed inside a housing (26), which rotors and/or stator are equipped with blades having impact surfaces, and which form one or more rings (1,2,3, . . . ) coaxial with the rotor. The waste is fed into the housing through the hub of rings formed by the blades, and travels by the effect of a rotor or rotors, to the outer ring of the ring (7) formed by the outermost blades, and further to the discharge opening (25, 27') at the outer ring.

14 Claims, 5 Drawing Sheets

METHOD AND DEVICE FOR DISINTEGRATION OF ORGANIC MATERIAL AND USE OF THE DEVICE

BACKGROUND OF THE INVENTION

The present invention relates to a method and apparatus according to the preambles of the independent claims presented later in this patent application for treating organic waste, especially for decomposing waste biologically and/or chemically. The invention also relates to the use of the apparatus.

Waste containing organic matter derived from livestock husbandry, as do many types of community waste, contain a great deal of useful soil-improvement material. All waste is not, however, suitable to be used as such for soil-improvement because of its odour etc. Moreover, most of the waste contains a lot of material that is unsuitable for soil improvement because of its shape or composition. Besides, since a lot of waste is produced and accumulated in places where its transport for soil improvement over long distances would be difficult and expensive; its exploitation is not optimal today.

It is a known practice to treat waste containing organic matter biologically by decomposition, in which process it is also possible to eliminate problems caused, for example, by odour. Waste can be decomposed in bioreactors by bacteria-mediated anaerobic digestion and/or by aerobic digestion using composting. The biogas formed in decomposition can be used, for example, in energy production. The solid waste formed in decomposition and energy production, which is odourless and contains large amounts of nitrogen, phosphorus and potassium, is easier to process further for soil-improvement material.

In digestion, the waste and a specified amount of liquid are introduced into a closed decomposition reactor, where anaerobic bacteria are allowed to act so as to decompose the waste sludge formed in the reactor. Among other substances, methane-containing biogas is formed in this reaction, which is recovered for re-use, e.g. for combustion. Digestion is an advantageous way to treat various types of biological waste, such as household and agricultural waste, including waste from the food industry. Also sewage sludge from waste water plants can be digested. After digestion and collection of biogas, the sludge is in a more advantageous form for all kinds of further treatment. Liquid separated from the treated sludge can be recycled in the decomposition process, or purified. Dry matter separated from the treated sludge can be composted to form nutrient-rich humus, which can be further used in soil improvement.

It is known that decomposition reactions are relatively time consuming. In addition, decomposition has often been shown to be incomplete and unsatisfactory. Part of the sludge tends to emerge from the reactor as such, or it is only partly decomposed. It is shown in WO publication 95/32158 that one reason for this is uneven moisture content of the waste material. The proposal for improvement presented in the WO publication is to feed waste or sludge into the bottom part of a decomposition reactor having a special shape, and then feed liquid into its upper part. In the reactor, the waste is arranged so as to travel from bottom to top. The biogas formed from the waste in the decomposition reactor is dissolved into the liquid, from where the biogas is collected in a separate bioreactor. The aim is thus to achieve a better result by selecting a special reactor type and special waste sludge treatment process.

Earlier it has been proposed in the European patent application EP 0 679 719 A2 that solid waste should first be separated from mixed waste containing organic waste such as household waste using a screen or metal separator, after which the waste should be ground into a pumpable sludge, which in turn can be treated by hydrolysis and digested using anaerobic digestion. The aim is to achieve complete sludge digestion using two or more bioreactors arranged in series.

BRIEF SUMMARY OF THE INVENTION

The purpose of the invention is to present an improved method and apparatus for degrading—biologically and/or chemically—waste containing organic matter, particularly degrading by the use of microbes.

The purpose of the invention is to present a method and apparatus that will enable fast and maximally complete biological and/or chemical decomposition.

The purpose is also to present a simple method and apparatus that will improve the efficiency of the decomposition reactions of known decomposition reactors.

The purpose of the invention is also to enable treatment of various waste and sludge containing organic matter with the help of microbes in decomposition reactors or the like.

The above-mentioned objectives are achieved using the method and the apparatus according to the invention, which are characterised by what is presented below in the characterising parts of the independent claims.

A typical method according to the invention comprises at least
- a new type of waste pretreatment in a pretreatment apparatus and
- an actual waste decomposition treatment in any known decomposition reactor or any other type of device suitable for the purpose, or the like, in which the decomposition is typically performed by microbes, either anaerobic or aerobic bacteria. It is also possible to use other decomposition-inducing materials and bacteria. For example, catalysts, enzymes, substances regulating pH-level or other substances promoting the decomposition process can be used. The invention can be used in a wide variety of decomposition processes known as such.

BRIEF DESCRIPTION OF THE DRAWINGS

The presented invention is referred to in more detail in the attached Figures, presented only as examples, in which.

DETAILED DESCRIPTION OF THE PREFERRED EMBODIMENTS

It has now unexpectedly been discovered that using pretreatment according to the invention it is possible to considerably improve and accelerate, in a very simple way, the actual biological and/or chemical decomposition in a decomposition reactor. Using the pretreatment apparatus according to the invention, arranged before any anaerobic decomposition apparatus known as such, it is possible to produce from a relatively solid waste, by adding liquid and by fragmenting the solid waste, a highly reactive sludge that is easy to decompose efficiently and fast for the actual decomposition process.

Pretreatment according to the invention is effected using a pretreatment apparatus, which operates on the principle of a multi-ring double-action impact mill. This type of apparatus has been proposed earlier for use in entirely different types of process, i.e. in paper manufacture, in processing pulp stock, defibration and silting of coating slip as presented in FI publications 105699 B and 105112 B, and in the WO publication 96/18454.

A typical pretreatment apparatus according to the invention comprises a fragmentator formed by two rotors disposed coaxially inside a housing but rotating in opposite directions. The rotors typically rotate horizontally around a vertical axis but they can also be mounted to rotate at a desired inclination. Both rotors are equipped with blades having impact surfaces and that are typically disposed in one or more, typically in at least two, coaxial rings relative to the rotors. The rings of the first rotor are disposed in such a way as to be staggered in relation to the rings of the second rotor. There are typically more than two rings in each rotor. Typically, the apparatus has 3-8 rings but there may also be more rings. Instead of two rotors, the apparatus may consist of one rotor and one stator, in which case the impact surfaces of every other ring are stationary. The blades typically denote means fitted inside the rings, such as cross-sectionally circular, square or rectangular rods or plate-like pieces, which form obstacles or impact surfaces in the way of the material to be fragmented.

The pretreatment apparatus according to the invention is very easy and simple to use, because the material fed into the hub of the rotor of the apparatus is automatically sucked inside the apparatus due to the rotation of the rotors. Moreover, the impact surfaces are shaped in such a way that they hurl particles colliding with them outwards, toward the impact surfaces of the next ring. In the end, the fragmented or ground material is forced by centrifugal force beyond the reach of the rotors.

There is a feed opening in the housing located at the hub of the rotor rings—typically in its upper part. Waste to be fragmented and liquid, microbes and other additional material possibly to be added into the apparatus, are also advantageously fed through the feed opening towards the hub of the rotor, where all the material is thrust outwards, colliding first with the impact surfaces of the blades of the innermost ring, i.e. the blades of the first rotating rotor. The impact surfaces of the blades are disposed in the rings so that they generate kinetic energy for colliding particles, which energy hurls the particles further outwards, towards the impact surfaces of the blades of the next ring. In other words, as the impact surfaces of the innermost ring—i.e. in this case the second ring encountered by the waste—of the second rotor rotate in the opposite direction in relation to the first impact surfaces, the collision of particles with the impact surfaces of the second ring is so powerful that it hurls the particles with an even greater high kinetic energy than previously, toward the second ring of the first rotor—i.e. the third ring encountered by the waste. The collisions thus increase the kinetic energy of waste particles from ring to ring, thus accelerating the waste fragmentation and the radial zigzag outward motion.

It is possible to arrange the apparatus in a housing in such a way that the housing wall forms a ring-shaped or cylindrical casing that receives the fragmented material, flung outwards from the ring of the rotor. This casing, i.e. the housing wall, is typically furnished with a discharge opening fitted tangentially to the housing wall. On the other hand, if the housing is spacious compared to the rotor area, the outer ring of the rotors can be left open, i.e. without a casing, the pretreated material can be allowed to be hurled away from the space confined by the rotor towards the housing walls. The pretreated material may descend directly towards the bottom of the housing, or flow down along the walls towards the bottom, which is advantageously funnel-shaped.

The dwell-time of the material in the apparatus is very short, less than 10 seconds, typically less than 5 seconds, and even more typically less than 1 second. Thus the material flows very rapidly, practically without time-lag through the apparatus. The apparatus has thus a high capacity, and is well suited for use along with very different types of continuously operating equipment.

It has now been discovered unexpectedly that by using the pretreatment apparatus according to the invention it is possible to grind the material to a very small grain size. Earlier it was only possible to crush waste material to a grain size of about 50 mm. According to the method and apparatus of the invention, it is possible to grind the waste material easily and efficiently mainly to a grain size of 5 mm. Moreover, many types of waste such as most biological wastes from agriculture can easily be fragmented mainly to less than 3 mm grain size, even less than 1 mm grain size. Using the apparatus according to the invention it is often possible to fragment many types of waste, such as community waste, into the material of which 95% is of less than 5 mm grain size. Tough, stretching waste material like plastic may remain as long, thin strips. Many types of biological waste can be fragmented into material in which 50% is of less than 3 mm grain size, and of which the majority, as much as 20%, may be of less than 1 mm grain size. Waste containing mainly easily fragmentable material such as livestock manure or the like, can on average be fragmented to an even smaller grain size. When considering the apparatus according to the invention we can therefore talk about fragmenting to the micro level, i.e. about microfragmention, micro disintegration or micro dispersing. This micro-level fragmentation during pretreatment is useful in many ways with regard to further treatment.

It has now been discovered unexpectedly, that in the pretreatment apparatus according to the invention, the powerful collisions occurring at high kinetic energy between the waste and the impact surfaces generate high shear forces, which fragment the waste, even to the micro level. The waste material being pretreated is further fragmented by the so-called guillotine effect, which is created between the blades as they rotate against each other. Also the turbulence, vibration and pressure pulses generated within the apparatus further promote the fragmentation.

In the pretreatment apparatus according to the invention, over- and underpressure pulses generated between the impact surfaces cause fragmentation of waste at micro or cell levels. Pressure pulses are generated between the two impact surfaces moving in opposite directions when (a) underpressure is generated between the surfaces as they draw apart from each other and (b) overpressure is generated between the surfaces as they approach each other. Over- and underpressure pulses force liquid into and out of the material, even at the cell level, which causes the cells to rupture and thus facilitates the fragmentation of the material at micro level. Thus microbes can penetrate deep into the material being treated.

Experiments show that pretreatment according to the invention ruptures cells. Cell rupturing promotes waste fragmentation, and consequently also separation of water from the waste. This is useful in further processes, as waste composting becomes easier and the combustion value of the waste increases. Because of its high dry matter content and excellent homogeneity, the composted product is also easier to use and to process further. When the invention is applied, it is easy to produce customized mixtures for plants by mixing sand, peat, lime and/or fertilizers into biological waste in different proportions.

With fragmentation in the pretreatment apparatus according to the invention, it is possible to release a vast number of reactive surfaces, through which microbes, for example, can affect the waste material efficiently and rapidly. With the apparatus it is also possible to release reactive surfaces in material in cases where conventional grinding has no effect. It is believed that the great advantage obtained by using the invention, compared to earlier methods, derives from the fact that it is possible with the apparatus—unlike conventional devices—to affect waste material even at micro level, by rupturing cells.

In the solution according to the invention, reactions between the waste and microbes can be initiated already at the pretreatment stage, by feeding microbes from the actual reactor back into the pretreatment apparatus. In the apparatus, the microbes are effectively mixed with the fragmenting waste, and they instantly come into contact with the released reaction surfaces.

It has also been noted that in many cases it is worthwhile to carry out the pretreatment of waste in water, which seems to facilitate the decomposition of the waste particles. Water or another liquid can be added to the treatment process simultaneously with the waste.

The invention is suitable for use in a wide variety of digesting processes where the waste containing organic matter is decomposed. The waste can, for instance, comprise biologically degradable components containing solid waste and/or sludge, such as community waste, sludge from waste water treatment plants, agricultural waste, such as waste from livestock husbandry, slaughter waste, waste from the fishing industry and gardening, waste the from the food industry and/or other industrial waste.

A great advantage of the method according to the invention compared to earlier aerobic or anaerobic pre-treatment processes is that the pre-treatment apparatus can be made of a very sturdy structure. This sturdily-constructed apparatus can pretreat waste that contains coarse solid matter, such as glass waste or even rock material without problems. In earlier pretreatment processes, waste had always to be screened out first in order to remove rock material, glass waste and the like. The apparatus according to the invention is capable of decomposing this type of non-organic waste into a sand-like substance.

Pretreatment according to the invention is applicable for use in both anaerobic bacteria-mediated decomposition, typically digestion, and in aerobic bacteria-mediated decomposition, typically composting, or in gasification pretreatment.

The waste used in typical digestion, that is biological decomposition using anaerobic bacteria, should be sludge, which can be pumped to a decomposition reactor operating as a digestion reactor. The pumpability of sludge depends on many aspects, such as the viscosity of the sludge, and the size and shape of particles in the sludge, which means that the pumpability of sludge may vary between different sludges even though their dry matter content is the same. The dry matter content of sludge should generally be in many biological decomposition processes about 10-30%, in which case it is also pumpable. If waste is dry as biowaste collected from households usually is, liquid must be added to the waste to form a sludge.

Among other things, the purpose of pretreatment is to turn the waste into a pumpable sludge, which means that, in order to achieve this, liquid must often be added to the pretreatment apparatus to produce a pumpable sludge. The apparatus according to the invention is well suited for use in sludge-formation from waste. It is easy to feed an appropriate amount of liquid simultaneously along with the waste into the apparatus, possibly adding other substances as well to promote sludge-formation. The apparatus fragments and homogenises the substances fast and effectively into a stable sludge, in which all substances have large and active reaction surface areas, and in which substances come into contact with each other well. Moreover, it has been observed that adding liquid such as water is advantageous for the actual fragmentation process, thus facilitating and accelerating the fragmentation.

Another advantage obtained by using the pretreatment apparatus according to the invention is that it is possible to feed simultaneously both solid and liquid substances, such as solid and liquid waste, into the apparatus. It is not possible to do this in practice using traditional pretreatment apparatuses, such as various crushing and screening devices.

Some suitable liquid, such as raw water, process water or liquid separated from sludge at some stage, e.g. liquid separated from the solid substances formed in the decomposition reactor, can thus be added to the pretreatment apparatus to promote sludge-formation. Liquid can be added either before or after pretreatment. In addition, sludge-formation can be promoted by adding—typically in the pretreatment apparatus—some other substance that has a high liquid content, such as thin sewage sludge, i.e. sludge with a very low dry matter content. By recycling liquid or sludge back into the pretreatment apparatus, it is possible at the same time to recycle useful microbes, and thus to initiate the reactions faster.

It is also possible to add other essential or advantageous substances to the waste or sludge formed from the waste, to promote decomposition in the pretreatment apparatus. Typically, these are substances that cause or promote decomposition with the help of microbes, typically anaerobic bacteria, catalysts, enzymes, pH regulators, substances affecting viscosity, substances affecting sludge temperature, such as steam and combustion gases, and possibly also other substances.

When desired, the waste to be processed using anaerobic decomposition can be kept in an oxygen-free space by arranging, for example, nitrogen scavenging in the pretreatment apparatus.

When necessary, the pretreatment apparatus can be closed so that pretreatment proceeds either at over- or at underpressure. In this case the waste can be fed in and out of the apparatus using a check valve or other applicable valve.

When necessary, pretreatment or actual decomposition can be arranged so that it takes place at a certain pH, by adding a pH-regulating substance in the waste in the pretreatment apparatus.

Correspondingly, the pretreatment and actual decomposition can be carried out at a certain temperature by adding steam, combustion gas or other temperature-elevating substances to the waste in the pretreatment apparatus, or elsewhere.

The pretreated waste can be aerated effectively for aerobic decomposition by mixing in a dry material, such as small sticks, chips, bark, straw, dry hay or peat, in the pretreatment apparatus. During pretreatment, the waste can be ground to such a particle size that decomposition reactions are completed within the desired time.

It can be considered an important advantage of the invention, that in the pretreatment apparatus according to the invention, it is possible to fragment waste and other substances possibly added into the apparatus so that they have an extremely large and active reaction surface area. Moreover, all substances can be homogenised so that they come into contact with one another effectively. This is especially important when only small amount of other substances, such as microbes or catalyst, are added to the large quantity of waste, while the said substances must come into contact with all parts of the waste. In the pretreatment according to the invention, the waste comes effectively and evenly in contact with the digesting bacteria. This considerably accelerates reaction speed and promotes completeness of the actual decomposition process. Several reactions can be initiated or even partly completed in the pretreatment apparatus.

In the pretreatment apparatus according to the invention, it is possible to feed all components to be added to the waste simultaneously into the pretreatment apparatus, and thus separate feeds or feeding points are not needed.

In the pretreatment apparatus according to the invention, new "clean" surfaces are formed in the impact surfaces of waste particles as they collide and fragment, which new "clean" surfaces appear to be more active than "old" surfaces. Bacteria coming into contact with these surfaces seem to react extremely fast with the waste material, whereby the reactions of the bacteria are accelerated more than usual, also into the particles. As the particles in the solution according to the invention are fragmented already during pretreatment, as proposed in the invention, the reactions proceed fast to completion.

The reactions are substantially slower in particles treated in a conventional mixing apparatus.

It appears that in the pretreatment apparatus operating on the principle of a multi-ring double-action impact mill, the apparatus shears and activates the surfaces of the particles travelling through the apparatus. Atoms come off the particles, thus activating the surfaces and making them highly reactive. This seems to explain partly why it is possible to initiate very fast and efficient reactions between the components fed into the apparatus.

Figure 1:
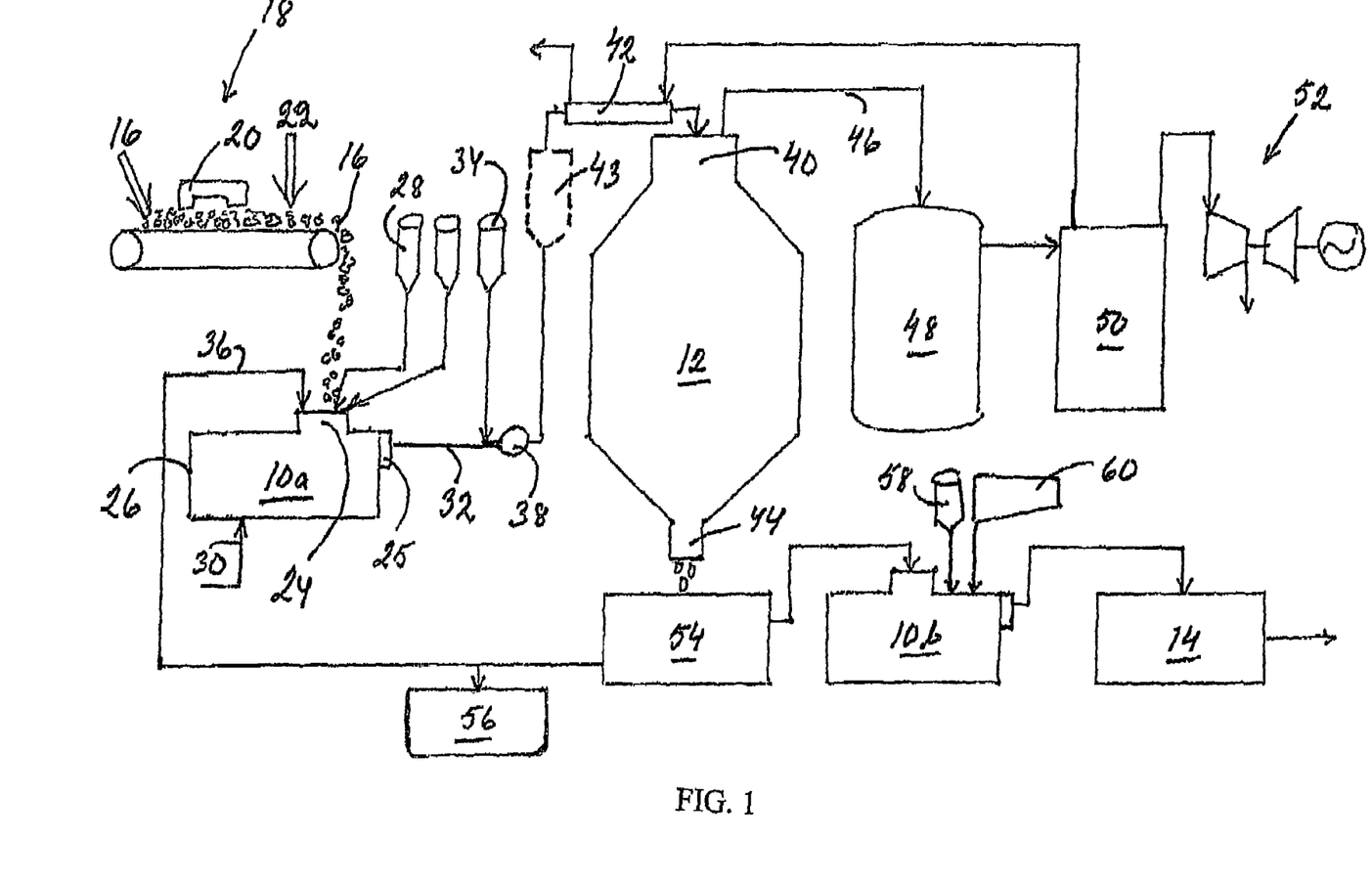
FIG. 1 shows in the form of a diagram a waste digestion plant, where the solution according to the invention is applied.

FIG. 1 shows a digestion plant, which processes organic waste such as community, waste or waste deriving from livestock husbandry, piggeries, slaughterhouses or from the food industry. The same type of a plant could be used for treating other types of digestable waste, such as sludge from water purification plants. The plant comprises a pretreatment apparatus 10a according to the invention, arranged in front of a digestion reactor 12, i.e. in front of the actual anaerobic decomposition reactor. This plant also comprises another pretreatment apparatus 10b arranged in front of a compostor 14. Waste is fed into the decomposition reactor in the form of sludge in the case presented in FIG. 1. Using other processes applied in the invention it is possible to decompose dry waste, or waste with lower water content.

Waste 16 containing organic matter is brought into the process in the plant as shown in FIG. 1 through a coarse waste screening station 18, where, for example, scrap metal can be separated using a metal separator 20. In other corresponding plants applying the invention, the coarse waste screening station may comprise other apparatuses that separate coarse waste, such as screening drums, for removing oversized particles. When the method according to the invention is applied, the oversized particles can be removed altogether from the process or crushed in a disintegrator and returned to the process when necessary. The feed opening and the first impact surfaces mounted on the rings of the pretreatment apparatus according to the invention can be designed to be so widely spaced that the apparatus can take large, 100-300 mm, or even 500 mm sized particles.

It easy for the apparatus according to the invention to "swallow" and crush whole bottles, and even rocks, grinding them into a sand-like substance. Such coarse material would block traditional pretreatment apparatuses.

It is possible to add to the waste in the waste screening station 18, or entering or leaving the screening station, other material flows 22, such as other waste or substances facilitating waste treatment.

From the coarse waste screening station, the waste is fed to the feed opening 24 of the pretreatment apparatus 10a, equipped with a housing 26, and is pretreated before entering the actual decomposition reactor, i.e. the digestion reactor presented in FIG. 1. The housing 26 has walls 26'. The pretreatment apparatus 10a operates on the principle of a multi-ring double-action impact mill in which waste and other matter possibly fed into the apparatus are fragmented and homogenised. It is possible to feed, either from one or several silos 28, or the like, anaerobic digestion bacteria, catalyst, enzyme, substances promoting sludge-formation from waste, pH-regulating substances and/or other substances promoting digestion into the pretreatment apparatus. The substances can be added from the same silo or from different silos.

When desired, it is possible to arrange pretreatment in the apparatus 10a so that it is effected in an anaerobic, i.e. oxygen-free state, by arranging, for example, nitrogen or other corresponding scavenging in the space. Nitrogen scavenging prevents oxygen/air from entering the process, where it would kill anaerobic bacteria FIG. 1 shows a nitrogen feed 30 into the apparatus. Other gases such as combustion gases advantageous for the decomposition process or any further processes can be added to the process. When desired, pretreatment can arranged to take place either at under- or overpressure, in which case the apparatus 10a is a fully closed system, and in which the feeds and discharges are arranged using pressure valves.

Substances essential for the process can be added if necessary, or alternatively can be added, to the waste sludge flow coming out of the pretreatment apparatus 10a in the tube 32, from the silo 34.

Liquid is added to the pretreatment apparatus 10a via the pipe 36 to promote fragmentation, and to promote sludge-formation of waste and other material fed into the apparatus advantageously to form a pumpable sludge. The liquid may be liquid separated later in the process, as shown in the figure, and/or it may be either raw water or wastewater or both.

Sludge is pumped with the pump 38 through the pipe 32 to the upper section of the digestion reactor 12, to the feed opening 40. When desired, the sludge can be fed to the digestion reactor by other devices, such as a motor-driven discharge screw or the like disposed tangentially in the discharge opening of the pretreatment apparatus. It is, of course, also possible if desired to feed sludge into the reactor via an opening in its side or bottom. When desired it is possible to heat the sludge to the desired temperature, using steam or hot water, for example using a heat exchanger 42 as presented in the figure.

When necessary it is possible to install any as such known device between the pretreatment apparatus 10a and the actual digestion reactor 12, such as a hydrolysis reactor 43, for treating the waste sludge.

The nutrient-rich solid waste is removed from the waste sludge in the digestion reactor 12 via a discharge opening 44 disposed in the lower part of the reactor as presented in the figure. Methane $CH_3$, carbon dioxide $CO_2$ and any other gases formed in the reactor are extracted via the discharge pipe 46 to the gas chamber 48. The gas can be used as combustion gas in a combustion boiler 50, to produce hot water and/or steam. The steam can be used for electricity generation in a steam turbine plant 52 and/or for heating in a process, such as heating sludge, in the heat exchanger 42.

Liquid is separated from the solid waste leaving the digestion reactor so that it is in a suitable form for further treatment. When necessary, it is possible to keep the solid waste gained from the digestion process at a temperature of over 70° C. for a certain safety period. Liquid can be removed from the solid waste using any known mechanical water separator such as a filter, a press or a centrifuge and/or drier. The separated liquid can be taken to water purification 56. Part of the separated liquid can be fed via the pipe 36 back into the pretreatment apparatus for waste sludge-formation.

Separated and possibly dried in the water separator 54, solid waste from digestion, which has possibly agglomerated to make fairly large aggregates during drying, can be taken to final aerobic decomposition in a compostor 14 or the like. In such a case it is advantageous first to pretreat the agglomerated dried solid waste as presented in FIG. 1, using the pretreatment apparatus 10b according to the invention, where the solid waste is fragmented and homogenised to increase the efficiency of actual aerobic decomposition. The pretreatment apparatus 10b may operate on the same principle as the pretreatment apparatus 10a. The apparatus may, however, contain fewer impact surfaces and rotors than the pretreatment apparatus 10a, and the rotors may be slower, because the agglomerates are relatively easy to decompose. Efficient fragmentation is not usually necessary, and mixing alone suffices.

In addition to solid waste, it is possible to add from the silo 58 into the apparatus 10b suitable microbes, aerobic bacteria, possibly a catalyst, enzymes, pH-regulating substances and/or other additional substances advantageous for decomposition. Moreover, it is possible to add a suitable drying agent such as chips, small branches, bark, straw, dry hay, peat or the like, into the apparatus 10b from the silo 60, in order to keep the solid waste aerated. The pretreated solid waste is taken to the compostor 14 which can be any as such known device suitable for composting.

FIG. 1 presents a process in which pretreatment apparatuses are used in association with either waste digestion or composting. The method and apparatus according to the invention can be used, of course, only in association with either digestion or composting. On the other hand, the invention can be applied in such processes in which the waste is only either digested or composted, or is decomposed in some other corresponding way.

It can also be considered an important advantage of the apparatus according to the invention compared to the prior art that the apparatus can simultaneously decompose both organic waste and large non-organic particles among the organic waste, such as glass bottles and rocks, and that the waste material can be decomposed even to the cell level.

The apparatus according to the invention is suitable to be used in the pretreatment phase of very different as such known decomposition processes, in pretreatment it is advantageous to fragment and homogenise the material before the actual decomposition process. The apparatus is also suitable for treating the solid waste obtained from decomposition reactors, and to put this waste to practical use, especially when homogenising is advantageous for further processes.

Figure 2:
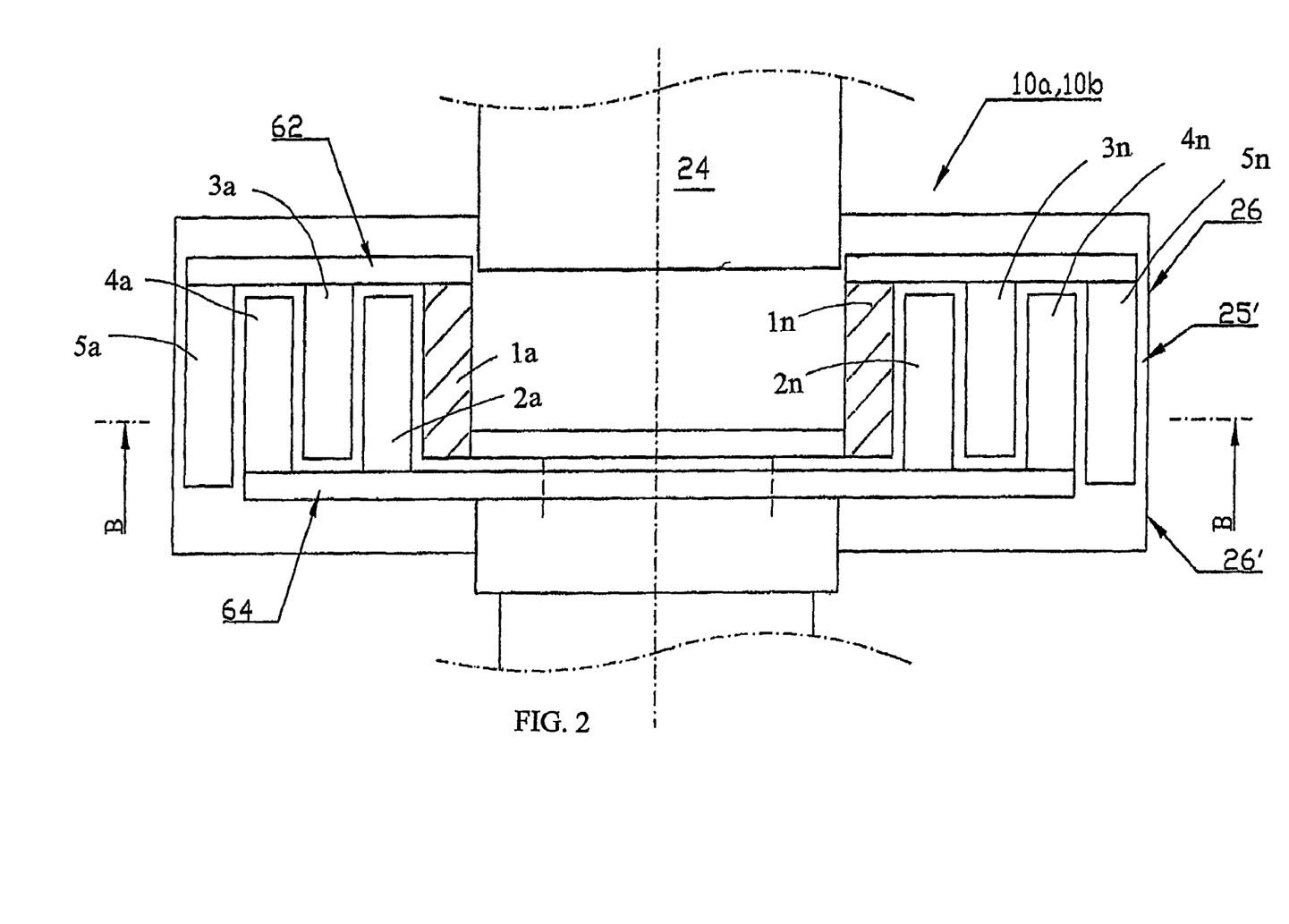
FIG. 2 shows in the form of a diagram a vertical cross-section of a pretreatment apparatus equipped with five rings, operating on the principle of a multi-ring double-action impact mill, taken from the cross section AA of the almost identical seven-ring apparatus as presented in FIG. 3.
Figure 3:
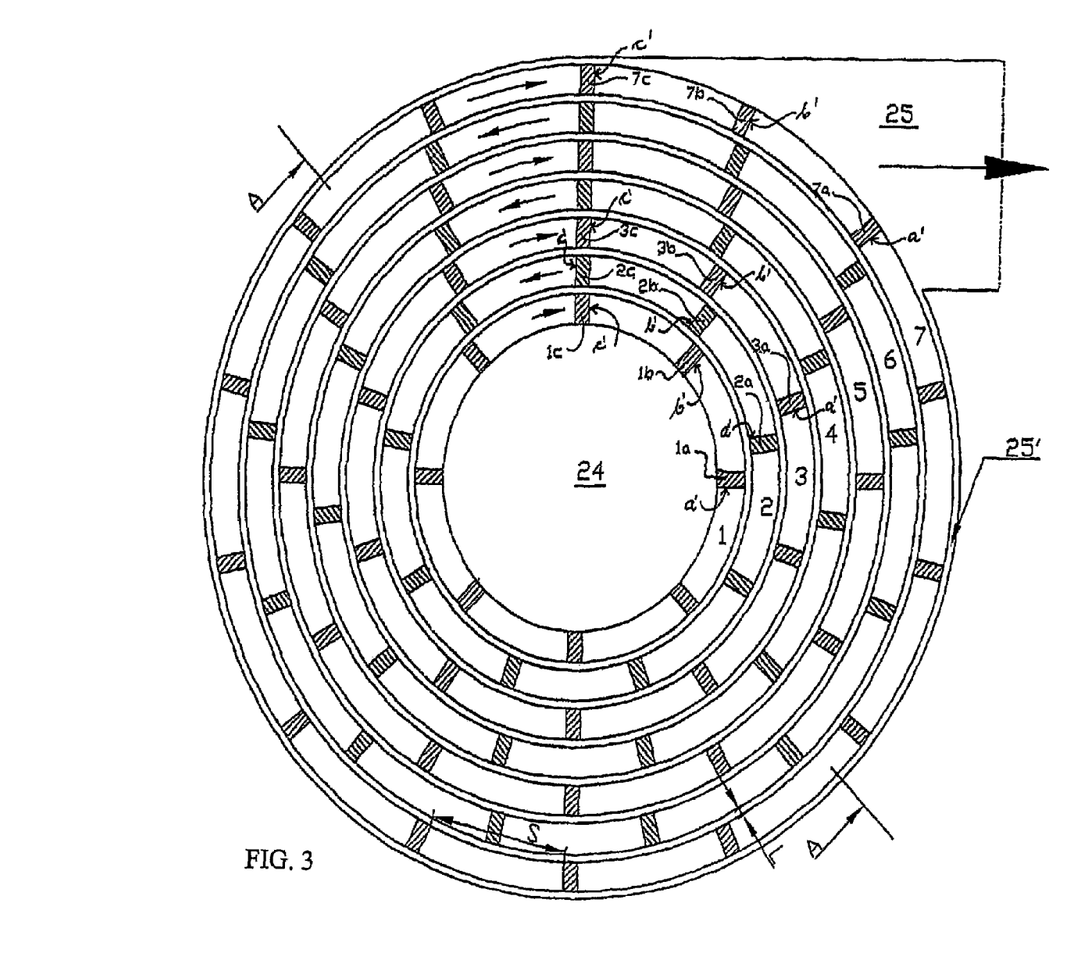
FIG. 3 shows in the form of a diagram a horizontal cross-section from another pretreatment apparatus equipped with seven rings operating on the principle of a multi-ring double-action impact mill, taken from the cross-section BB of an almost identical five-ring apparatus as presented in FIG. 2.

FIG. 2, which is the cross-section AA from FIG. 3, shows a vertical cross-section of a typical pretreatment apparatus 10a or 10b with 5 rings, applied according to the invention. FIG. 3, which is a cross-section BB from FIG. 2, shows a horizontal cross-section of corresponding pretreatment apparatuses 10a or 10b with 7 rings.

The apparatuses presented in FIG. 2 and FIG. 3 are comprised of two coaxial rotors 62, 64 fitted inside a housing 26, i.e.

a first rotor 62 in which, in the case presented in FIG. 2, blades such as 1a, b, c and 3 a, b, c . . . , which blades have impact surfaces a', b', c' . . . , have been mounted on three coaxial rings 1, 3 and 5 of the rotor, and a second rotor 64, in which, in the case presented in FIG. 2, blades such as 2a, b, c . . . , which have impact surfaces a', b', c' . . . , have likewise been mounted on two coaxial rings 2 and 4 of the rotor.

In the case shown in FIG. 3, both rotors 62 and 64 have one more ring equipped with blades than the rotors shown in FIG. 2. Thus, the first rotor 62 has four rings 1,3,5 and 7 and the rotor 64 three rings 2,4 and 6, on which blades having impact surfaces a', b', c' . . . have been mounted.

The cross-section profile of the blades in FIG. 2 and FIG. 3 is rectangular, and turned so that the impact surfaces of blades are in the radially oriented. The impact surface of one or more blades may deviate from the radial orientation. The cross-section profile of blades may naturally differ from the rectangular shape, for example, they may be triangular.

The rotors 62 and 64 may freely rotate in opposite directions. The rings 1, 3, 5 and 7, and 2, 4 and 6 of different rotors are staggered as shown in FIG. 3. One of the rotors may be a stator. The figures do not show any as such known drives needed to rotate the rotors, such as motors, which may be disposed in the housing.

FIG. 3 shows the arrangement of blades 1a, b, c . . . and 7a, b, c . . . of the first rotor 62 with their impact surfaces, and the arrangement of blades 2a, b, c . . . of the second rotor 64 with their impact surfaces, on rings 1-7. The rings formed by the impact surfaces are located at a small horizontal distance L from each other. This distance may be the same for all adjacent rings, typically about 2-4 mm. On the other hand, the distance L between the rings may decrease in the direction from the centre of the device outwards, for example, the distance may >3 mm between the inner rings, and <1 mm between the outer rings.

The space 25' between the outermost ring 7 and the housing wall 26' forms an open ring-shaped or cylindrical chute that is open towards the rotors, along which chute the pretreated material, which has travelled through the rings 1-7, is channelled toward the discharge opening 25 of the housing as shown in FIG. 3. It is possible to connect tangentially a motor-driven discharge screw to the discharge opening, for further transport of the pretreated material.

In the advantageous solution presented in FIG. 3, the space between the blades, distance S, is much smaller at the outer rings 6 and 7 than at the inner rings 1 and 2. The distance S may also be the same. The solution according to FIG. 3 enables large material flows to be fed into the apparatus, containing relatively large, even coarse agglomerates. The smaller distance S at the outer rings enables efficient grinding of agglomerates.

A substantial advantage is achieved when the number of blades and the distances between the rings, i.e. the so-called tightness, can be selected according to the need. It is possible to arrange a decreasing distance between both rings and blades towards the outer rings, whereby the agglomerates or such being fragmented are packed into an increasingly tight space as they flow towards the outer ring, which makes fragmentation more effective.

Waste and possibly other material is fed to the apparatus via the feed opening 24, which is possible since the rotor axes are nested below the rotors. Treated waste is discharged through the tangential opening 25. Waste fed into the pretreatment apparatus is thrust outwards from the feeding opening 24, towards the innermost, i.e. the first ring 1 of the first rotor 62, where the waste encounters the impact surfaces a', b', c' . . . of the ring blades. From these surfaces the waste is centrifuged back with high kinetic energy, and at the same time outwards, towards the first ring 2 of the second rotor 64, colliding with the impact surfaces a', b', c' of the blades rotating in the opposite direction. From these impact surfaces the waste is again centrifuged in the opposite direction, and outwards with high kinetic energy, colliding with the impact surfaces of the second ring 3 of the first rotor 62. Thus the waste and any other substances continue their progress in the apparatus colliding in each ring with high kinetic energy with the impact surfaces a', b', c' . . . of the blades of the respective rings. The rotors rotating in opposite directions at high 1500-3000 l/min speeds, typically at 1600 l/min, generate powerful centrifugal forces that maintain an efficient flow in the apparatus.

Figure 4:
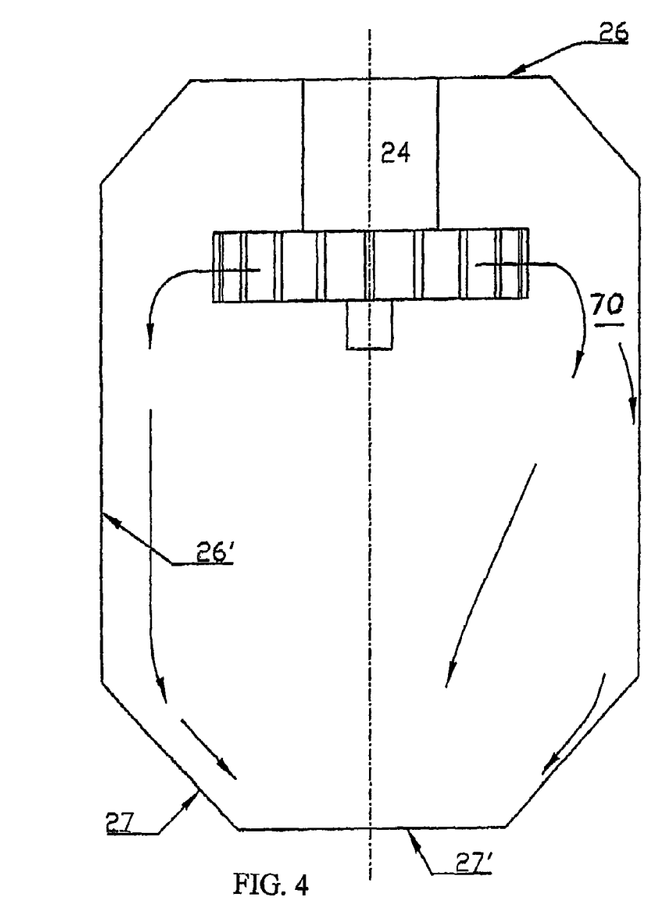
FIG. 4 shows in the form of a diagram a cross-section of the pretreatment apparatus as presented in FIG. 2, applied in an embodiment in which a rotor pair has an open outermost ring.

FIG. 4 presents a modified version of the apparatus presented in FIG. 2. FIG. 4 presents an apparatus in which the housing walls 26' are located at a distance from the outermost ring 5 of the rotor, creating a wide space 70 between the rotors and the housing walls, into which space the waste is flung from the impact surfaces a', b', c' . . . of the blades of the outermost ring 5. Part of the waste can freely fall down to the funnel-shaped bottom 27 of the housing, while part is flung against the housing walls 26' and flows down along the walls towards the discharge opening 27' located in the funnel-shaped bottom.

Figure 5:
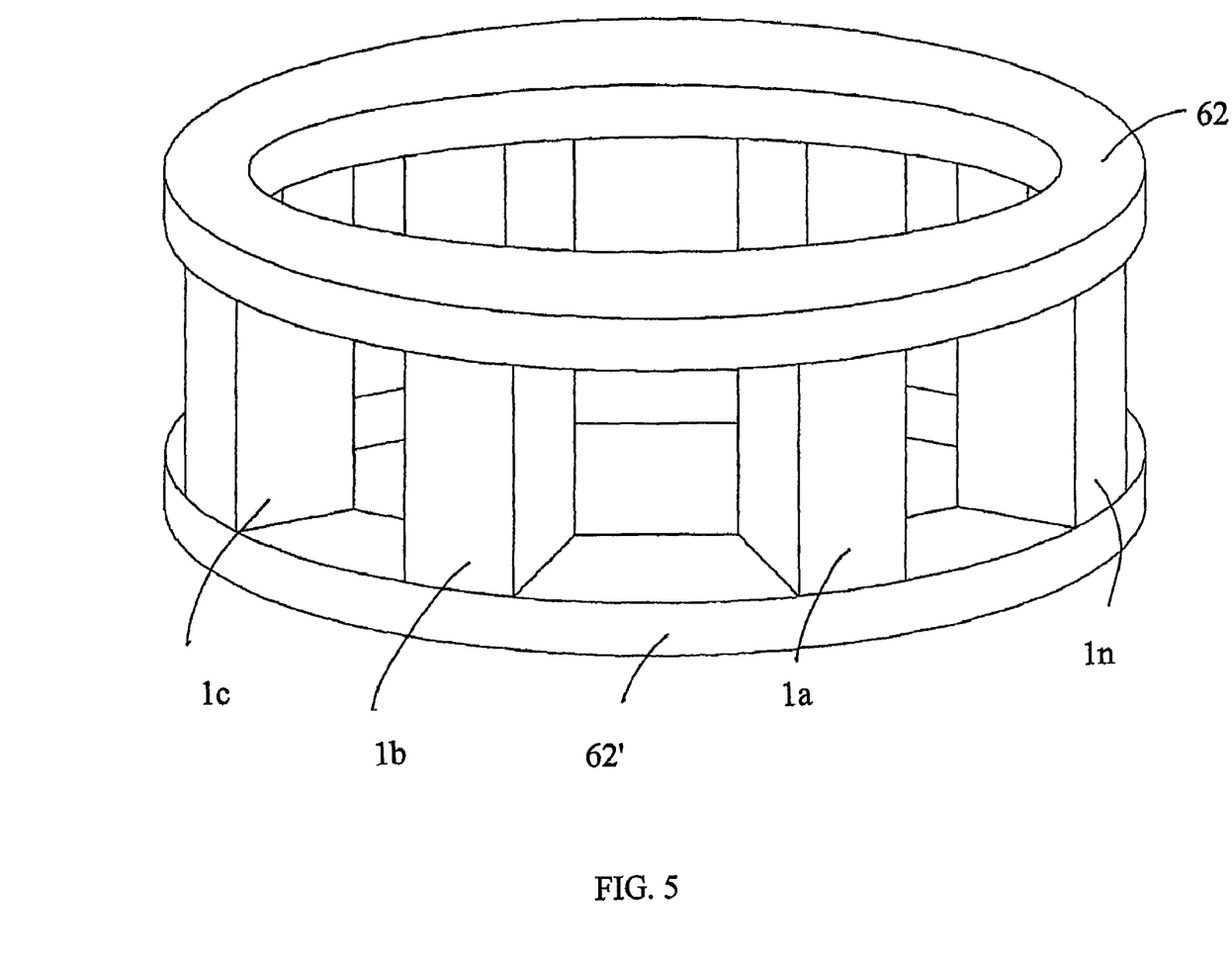
FIG. 5 shows in the form of a diagram a side view of a rotor part seen from above.

In the apparatus according to the invention, the blades 1a, 1b, 1c . . . 1n; 2a, 2b, 2c . . . 2n; 3a, 3b, 3c . . . 3n etc. of each ring 1, 2, 3 . . . n of both rotors 62, 64 are advantageously mounted on the apparatus, as can be seen in the case of the rotor 62 in FIG. 5, in which the blades are mounted not only on the actual rotor parts 62, 64 rotating the blades, but also on the typically ring-shaped 62', 64' support element mainly of the same width as the ring located at the other ends of each ring blade. FIG. 5 shows the blades 1a, 1b, 1c, . . . 1n of only one ring, which blades are attached by their upper part to the actual rotor part 62, and by their lower part to the support element 62'. The actual rotor part 62 is typically several rings wide in the radial direction, and on it are fitted blades on several rings, as shown in FIGS. 2 and 3. On the other hand, the support element is only one ring wide so that rotors 62, 64 can be nested. The support elements make the apparatus highly stable and strong.

In particular the following can be considered as advantages of the method and apparatus according to the invention:

new, highly reactive surfaces are formed in the waste material, or solid matter possibly added to this material, which enable, for example decomposition bacteria, to efficiently affect waste material through these surfaces, and to accelerate the decomposition process, waste material consisting of particles of almost any size can be fed into the apparatus, only the diameter of the innermost ring restricting the feed, all supplied waste material, regardless of its size, is instantly subjected to repeated and direction-changing powerful impacts, shear forces and turbulence, the treatment exerts on the material cyclical over- and underpressure shocks, which promotes fragmentation i.e. the separation of waste components from one another, and their continued separation the treatment enables fragmentation of waste material even to the cell level, which makes further reaction more effective when necessary the treatment makes it possible to obtain high dry matter contents, fragmentation and homogenisation provides loose waste matter of even composition, which is advantageous for further treatment and that the treatment makes it possible to produce stable, fine waste material.

The efficiency of the decomposition process according to the invention can be easily be increased by feeding some microbe-containing waste sludge from the actual decomposition apparatus back into the pretreatment apparatus.

The apparatus according to the invention is easy to make very strong and durable, in which case the apparatus can receive unscreened waste containing impurities such as glass bottles, and grind them into a very fine material.

The purpose is not to restrict this invention to the embodiments presented as examples above; on the contrary, the purpose is to enable use of the invention widely within the scope of the claims.

The invention claimed is:

1. Method for biological decomposition of waste which contains organic matter, where said method comprises the steps of pre-treatment of said waste, and subsequent biological decomposition of the pre-treated waste in a decomposition reactor in the presence of anaerobic bacteria, wherein said pre-treatment step comprises fragmentation, homogenisation, and slurrying of said waste into a liquid to bring said waste in a pumpable condition in a pre-treatment apparatus, which is a multi-ring double action impact mill, which comprises a housing equipped with a feed opening and a discharge opening, a first rotor disposed inside the housing, which rotor is equipped with blades having impact surfaces, and which blades form at least one or more rings that are coaxial with the said rotor, and a stator disposed inside the housing coaxially with the first rotor, or a second rotor rotating in an opposite direction, and which said stator or said second rotor are equipped with blades having impact surfaces, these blades of said stator or said second rotor forming at least one or more rings fitted coaxially with said stator or said second rotor, and which rings are disposed so as to be staggered in relation to the ring or rings of the first rotor, whereby the waste is fed through the feed opening of the pre-treatment apparatus into the hub of the rings formed by the blades, from where the waste is moved by the effect of a rotor or rotors to the ring formed by the outermost blades, and further to the discharge opening.

2. The method according to claim 1, wherein the blades on the rotors or on the rotor and the stator are arranged in at least two rings.

3. The method according to claim 2, wherein the waste comprises biologically degradable components containing solid matter and/or sludge.

4. The method according to claim 3, wherein said components are selected from the group consisting of community waste, sludge from waste water purification plants, agricultural waste, waste from livestock husbandry, slaughter waste, waste from the fishing industry, gardening waste and waste from food industry.

5. The method according to claim 1, wherein
the waste pre-treatment step comprises forming a pumpable sludge from the waste, the sludge having a 10-30% dry matter content, whereby
the necessary amount of liquid is added to the waste to form a sludge and,
the waste is fragmented in the pre-treatment apparatus to a particle size wherein more than 95% of the particles are less than 5 mm in diameter, and that
the decomposition of the waste comprises digestion of the sludge formed in the pre-treatment stage using anaerobic bacteria, where biogas comprising carbon dioxide and methane is produced.

6. The method according to claim 5, wherein said liquid is selected from the group consisting of raw water, process water, waste water and sludge having high liquid content.

7. The method according to claim 1, further comprising the step of adding to the waste flow entering and/or leaving the pre-treatment apparatus at least one of the following
a decomposition promoting substance selected from the group consisting of anaerobic bacteria, catalysts, enzymes, pH regulators, viscosity modifiers, steam and combustion gases,
microbe-containing process water that has been separated from the waste after pre-treatment, or during or after said decomposition treatment, and
microbe-containing treated waste, derived from the pre-treatment apparatus or decomposition step, which waste is recycled to the feed opening of the pre-treatment apparatus.

8. The method according to claim 1, wherein air is removed during the pre-treatment step from the waste to be pretreated for anaerobic decomposition treatment.

9. The method according to claim 1, wherein said method comprises the following successive stages in which
treated waste discharged from a pre-treatment step is degraded biologically in the decomposition step using anaerobic bacteria, so that biogas comprising methane and carbon dioxide is produced,
liquid that is excessive for further treatment is separated from the solid matter left over from the decomposition step, and the remaining solid waste is conveyed to a second pretreatment step, to be treated in a pre-treatment apparatus, which is a multi-ring double-action impact mill, and
the pretreated waste discharged from the second pretreatment step is degraded biologically in a second decomposition step using aerobic bacteria, or by gasifying the waste in a gasification reactor, so that a gas comprising carbon monoxide and hydrogen is formed, wherein said gas can be used as a fuel.

10. The method according to claim 9, wherein the waste is treated during the second pre-treatment step by
grinding the waste to a particle size suitable for the second decomposition treatment and
aerating the waste by adding a drying agent during the second pre-treatment step.

11. The method according to claim 1, wherein the method further comprises hydrolysing waste using hydrolysing bacteria in a hydrolysis reactor between the pre-treatment step and the decomposition step.

12. The method according to claim 1, further comprising preparing the waste for pre-treatment by
removing oversized metallic or other non-organic particles from the waste or
crushing the oversized particles.

13. The method according to claim 1, wherein the waste pre-treatment step is continuous and wherein the dwell time of the waste in the pre-treatment apparatus is less than 10 seconds.

14. The method according to claim 1, wherein
the waste is pretreated in said pre-treatment apparatus at either over- or underpressure and/or
the temperature of the waste is raised in the pre-treatment apparatus.

* * * * *